US011673215B2

(12) United States Patent
Puchta et al.

(10) Patent No.: US 11,673,215 B2
(45) Date of Patent: Jun. 13, 2023

(54) CONVEYOR SYSTEM

(71) Applicant: Purem GmbH, Neunkirchen (DE)

(72) Inventors: Christoph Puchta, Quierschied (DE);
Achim Glieden, Schiffweiler (DE);
Daniel Schneider, St. Wendel (DE)

(73) Assignee: PUREM GMBH, Neunkirchen (DE)

( * ) Notice: Subject to any disclaimer, the term of this patent is extended or adjusted under 35 U.S.C. 154(b) by 1080 days.

(21) Appl. No.: 16/263,174

(22) Filed: Jan. 31, 2019

(65) Prior Publication Data

US 2019/0240789 A1   Aug. 8, 2019

(30) Foreign Application Priority Data

Feb. 5, 2018   (DE) .................. 10 2018 102 457.6
Mar. 5, 2018   (DE) .................. 10 2018 104 880.7

(51) Int. Cl.
*B62B 3/04*    (2006.01)
*B62B 3/02*    (2006.01)
*B23K 37/04*   (2006.01)
*B62B 3/00*    (2006.01)
*B23K 101/00*  (2006.01)

(52) U.S. Cl.
CPC .............. *B23K 37/04* (2013.01); *B62B 3/001* (2013.01); *B62B 3/008* (2013.01); *B62B 3/022* (2013.01); *B62B 3/04* (2013.01); *B23K 2101/006* (2018.08); *B62B 2203/10* (2013.01); *B62B 2203/60* (2013.01); *B62B 2206/06* (2013.01); *B62B 2301/04* (2013.01)

(58) Field of Classification Search
CPC ......... B62B 3/001; B62B 3/008; B62B 3/022; B62B 3/04; B62B 2203/10; B62B 2206/06; B62B 2301/04; B23K 37/04; B23K 2101/006
See application file for complete search history.

(56) References Cited

U.S. PATENT DOCUMENTS 5,427,300 A  *  6/1995  Quagline .............. B62D 65/02
                                                    228/49.1
2005/0155841 A1* 7/2005 Gattrell ............. B23K 37/0443
                                                      198/375

FOREIGN PATENT DOCUMENTS

| CN | 202528891 U | 11/2012 |
| CN | 103010726 A | 4/2013 |
| CN | 203863238 U | 10/2014 |
| CN | 205817144 U | 12/2016 |

(Continued)

Primary Examiner — Bryan A Evans
(74) Attorney, Agent, or Firm — McGlew and Tuttle, P.C.

(57) ABSTRACT

A conveyor system conveys devices for receiving components to be welded together, especially for internal combustion engine exhaust systems, into and out of a welding cell. The conveyor system includes a conveying vehicle (62) with a chassis (64) that can travel on a subfloor via rollers (68). A superstructure (78) is carried vertically adjustably on the chassis (64). At least one device carrier (14) receives components to be welded together in a position intended for the welding together in relation to one another. A positioning/holding formation (94) is provided on the superstructure (78) and a counter-positioning/holding formation (103) that meshes or can be caused mesh with the positioning/holding formation (94) is provided on the device carrier (14) for presetting a conveying position of the device carrier (14) on the superstructure (78).

15 Claims, 6 Drawing Sheets

(56) References Cited

FOREIGN PATENT DOCUMENTS

| | | | |
|---|---|---|---|
| CN | 206578470 | U | 10/2017 |
| DE | 3851020 | T2 | 3/1995 |
| DE | 20202204 | U1 | 3/2003 |
| DE | 10335568 | A1 | 2/2005 |
| DE | 102008059614 | A1 | 6/2010 |
| EP | 3451096 | A2 | 3/2019 |
| GB | 2260717 | A | 4/1993 |
| GB | 2260717 | B | 8/1993 |

* cited by examiner

CONVEYOR SYSTEM

CROSS REFERENCE TO RELATED APPLICATIONS

This application claims the benefit of priority under 35 U.S.C. § 119 of German Applications 10 2018 102 457.6, filed Feb. 5, 2018 and 10 2018 104 880.7, filed Mar. 5, 2018, the entire contents of which are incorporated herein by reference.

TECHNICAL FIELD

The present invention pertains to a conveyor system for conveying devices for receiving components to be welded together, e.g., for internal combustion engine exhaust systems, into and out of a welding cell.

BACKGROUND

It is significant for carrying out welding operations that such devices for receiving components to be welded together be able to be introduced into and then removed from a welding cell of a welding system rapidly and with high precision.

SUMMARY

An object of the present invention is therefore to provide a conveyor system, which makes possible a rapid and precise positioning of devices for receiving components to be welded together, especially for internal combustion engine exhaust systems, in a welding cell even in case the system sections to be moved and positioned have a comparatively heavy weight.

This object is accomplished according to the present invention by a conveyor system for conveying devices for receiving components to be welded together, especially for internal combustion engine exhaust systems, into and out of a welding cell, comprising:
  a conveying vehicle with a chassis that is able to travel on a subfloor by means of rollers and with a superstructure carried vertically adjustably on the chassis, and
  at least one device carrier for receiving components to be welded together in a position intended for the welding in relation to one another,
  wherein a positioning/holding formation is provided on the superstructure and a counter-positioning/holding formation that meshes or can be caused to mesh with the positioning/holding formation on the device carrier for presetting a position for conveying the device carrier on the superstructure is provided on the device carrier.

Reliable handling and positioning of even heavy weights is made possible by the cooperation of the conveying vehicle and the device carrier.

A defined relative positioning of the conveying vehicle and the device carrier in relation to one another can be guaranteed by the positioning/holding formation comprising at least one and preferably at least two positioning/holding units and by the counter-positioning/holding formation comprising at least one and preferably at least two counter-positioning/holding units that mesh or can be caused to mesh with a first positioning/holding unit each, wherein the device carrier is held essentially immovably in each direction in space by each first counter-positioning/holding unit meshing with a first positioning/holding unit.

At least one and preferably each first positioning/holding unit or at least one and preferably each first counter-positioning/holding unit may have here a positioning/holding mount, and at least one and preferably each first counter-positioning/holding unit or at least one and preferably each first positioning/holding unit may comprise a positioning/holding projection that is positioned or can be positioned such that it meshes with a positioning/holding mount.

To ensure a stable holding together, provisions may be made for each first positioning/holding unit or/and first counter-positioning/holding unit to comprise a holding element preventing, in association with at least the positioning/holding projection that is positioned or can be positioned such that it meshes with a positioning/holding mount, the positioning/holding projection from moving out of the positioning/holding mount receiving same. For example, at least one and preferably each holding element may comprise a holding bolt that is positioned or can be positioned such that it passes through an opening of a positioning/holding mount and an opening of a positioning/holding projection that is positioned such that it meshes or can be caused to mesh with the positioning/holding mount, wherein said latter opening being aligned with said first opening.

To avoid detachment of such a holding element, it is further proposed that a locking device, which secures the holding element from moving out of the openings, preferably acts in a positive-locking manner and can be activated and deactivated by turning the holding element, be associated with at least one and preferably each holding element.

A defined relative positioning between the conveying vehicle and the device carrier can further be supported by the positioning/holding formation comprising at least one second positioning/holding unit and by the counter-positioning/holding formation comprising at least one second counter-positioning/holding unit that meshes or can be caused to mesh with a second positioning/holding unit. The device carrier is held in relation to the superstructure against motion essentially in the horizontal direction or/and against the movement in the vertical direction downward by every second counter-positioning/holding unit that meshes with a second positioning/holding unit.

For example, at least one and preferably every second positioning/holding unit may comprise for this a support surface on the superstructure, and at least one and preferably every second counter-positioning/holding unit may comprise a support, which is positioned or can be positioned such that it lies on the support surface on the superstructure.

To move a device carrier into the desired position, at least one handle may be provided on the conveying vehicle, preferably on the chassis, for moving the conveying vehicle. Further, the superstructure may be carried vertically adjustably in relation to the chassis by a scissor-type lifting mechanism, or/and a lifting machine meshing formation may be provided on the conveying vehicle, preferably on the chassis.

For the cooperation with such a lifting machine, configured, e.g., as a forklift or lift truck, the lifting machine meshing formation may comprise at least two lifting tool meshing openings, preferably meshing shafts extending essentially parallel to one another.

To make a precise adjustment of the superstructure in relation to the chassis possible even when comparatively heavy loads are to be moved, it is proposed that an adjusting drive actuated with pressurized fluid, preferably hydraulically, be associated with the scissor-type lifting mechanism, or/and that a connecting/actuating unit be provided at the conveying vehicle, preferably at the chassis, for connecting an adjusting drive associated with the scissor-type lifting mechanism to an energy source and for actuating the adjusting drive.

To hold a device carrier conveyed into a welding cell by means of the conveying vehicle in the welding cell for carrying out a welding operation, it is proposed that a second coupling unit, which can be caused to mesh with the first coupling unit and is provided for detachably fastening the device carrier to a first coupling unit provided in a welding cell, be provided at least at one device carrier and preferably at each device carrier.

A coupling unit of the first coupling unit and second coupling unit may have a pushing meshing recess, and the other coupling unit of the first coupling unit and second coupling unit may have a pushing meshing body that can be pushed into the pushing meshing recess in a direction of pushing.

To secure a stable position during a welding operation as well, a positive-locking positioning device adjustable between a released state and a positive-locking positioning state may be provided, and when the pushing meshing body is positioned such that it meshes with the pushing meshing recess, the positive-locking positioning device holds the pushing meshing body in an operating position relative to the pushing meshing recess against displacement in the pushing meshing recess in the positive-locking positioning state.

The pushing meshing recess may form an undercut, and the pushing meshing body pushed into the pushing meshing recess can extend behind the undercut, wherein the pushing meshing recess preferably has a dovetail inner profile and the pushing meshing body has a dovetail outer profile.

The present invention will be described in more detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
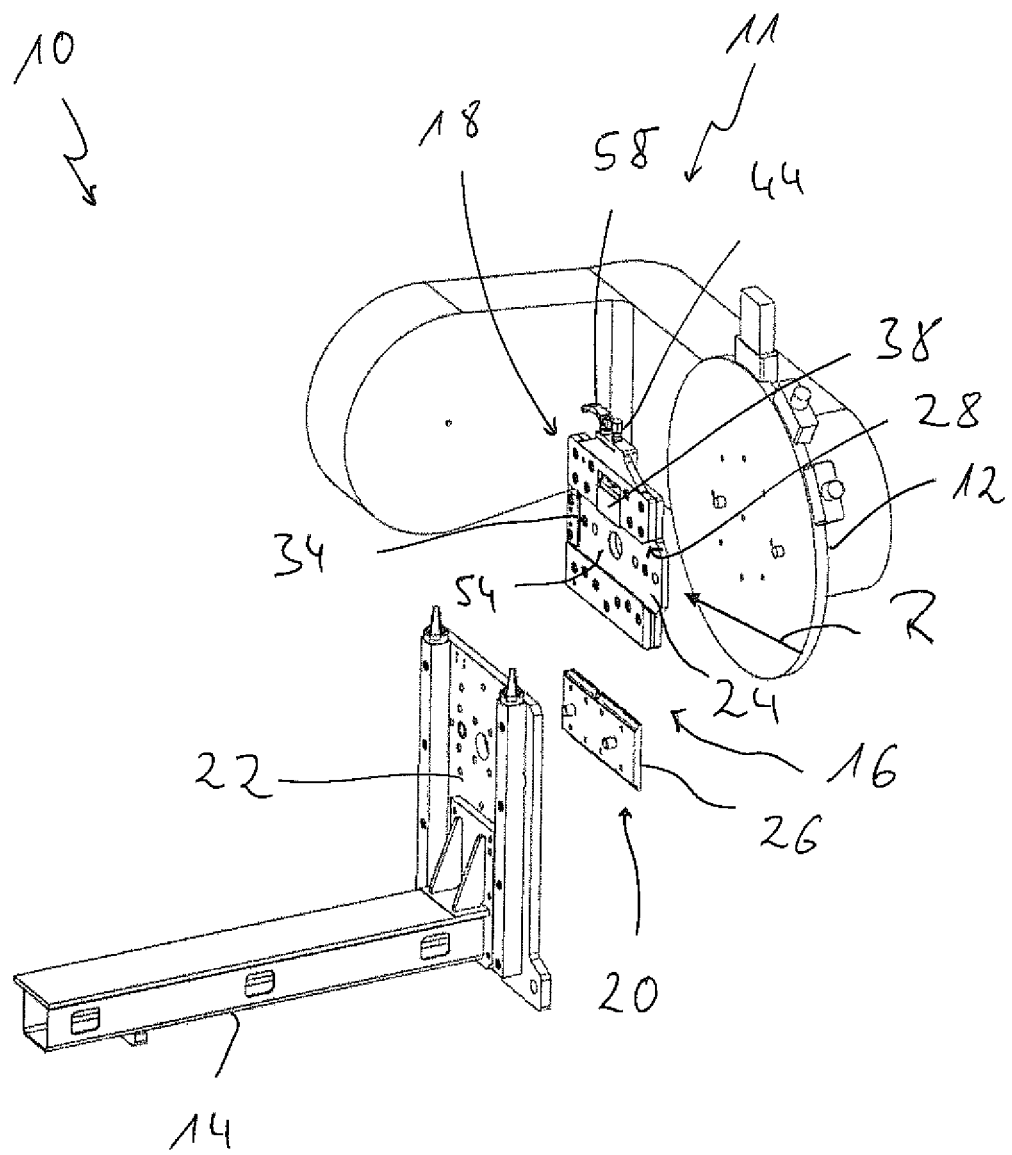
FIG. 1 is a perspective view showing the essential system sections of a welding system for welding components for internal combustion engine exhaust systems.
Figure 2:
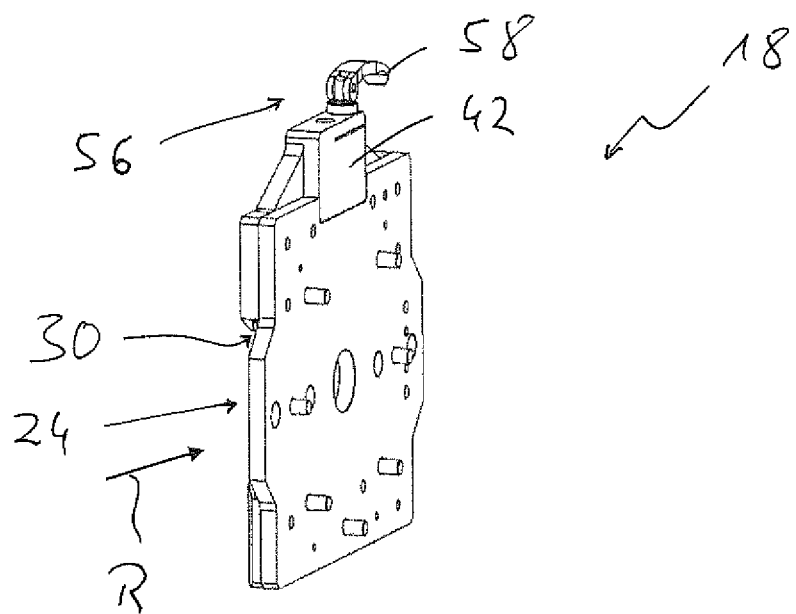
FIG. 2 is a perspective view of a first coupling unit of a quick-change coupling, which coupling unit is to be fixed on a carrier unit of a welding cell.
Figure 3:
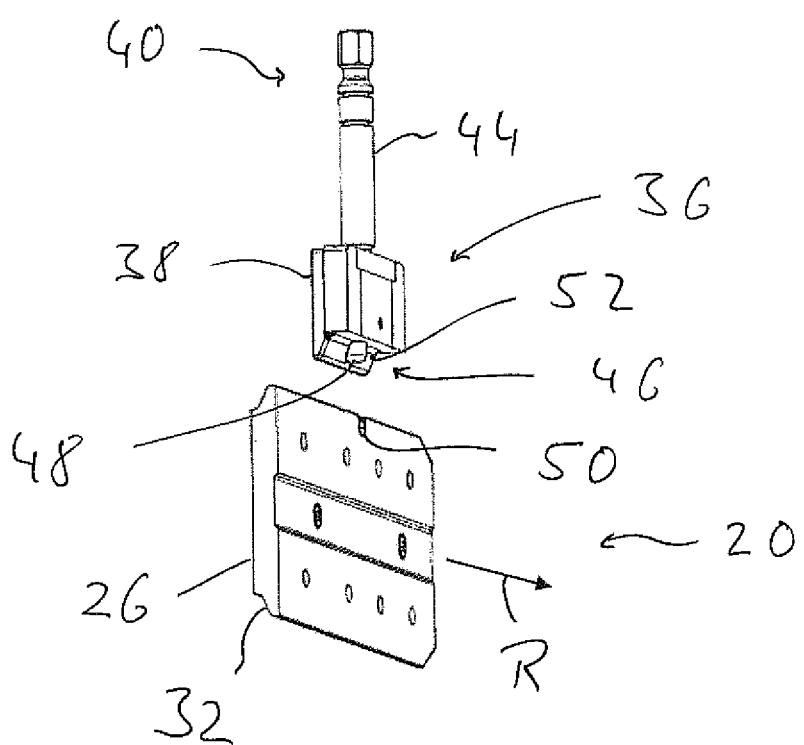
FIG. 3 is a perspective view of a second coupling unit of the quick-change coupling, which coupling unit is to be fixed on a device carrier, with an associated clamping positioning device.
Figure 4:
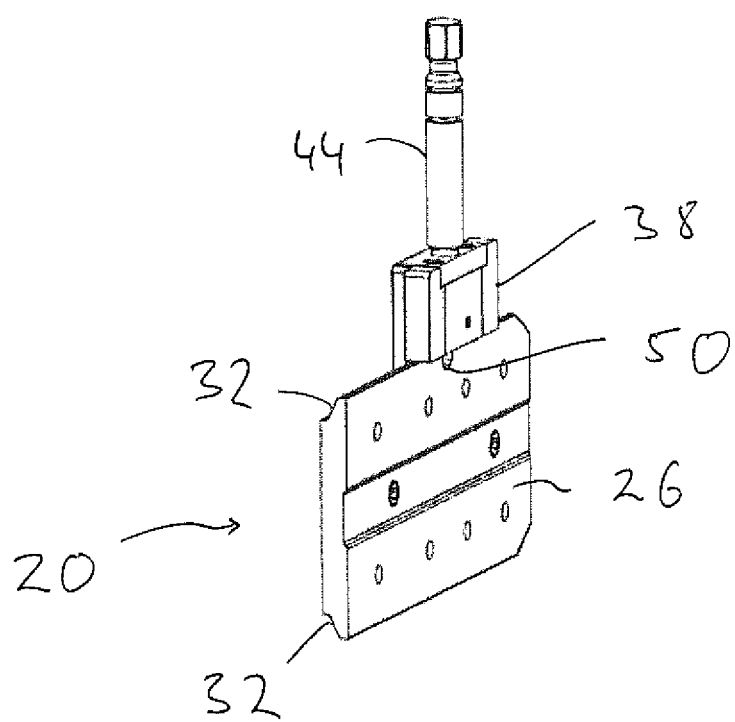
FIG. 4 is a perspective view, corresponding to FIG. 3, of a second coupling unit with the clamping positioning device acting thereon.

Referring to the drawings, FIG. 1 shows the system sections of a welding system, which is generally designated by 10. The system sections of the welding system 10 are essential for the positioning of components to be welded together, for example, for internal combustion engine exhaust systems. These system sections comprise a plate-like (plate shaped) carrier unit 12 arranged in a welding cell 11 as well as a device carrier 14 to be fixed on the carrier unit 12 for carrying out welding operations. The components to be welded together can be fixed in a position, intended for the welding, on the device carrier 14 by means of devices not shown in FIG. 1, e.g., by clampingly acting positioning elements. For adaptation to different types of the components to be welded together, e.g., for manufacturing different types of exhaust systems, the devices can be arranged variably on the device carrier 14 or different device carriers 14 with such devices can be introduced in different configurations and as needed into a welding cell.

The device carrier 14 can be fixed to the plate shaped carrier unit 12 by means of a quick-change coupling, which is generally designated by 16. The quick-change coupling is configured so that the components to be welded together, which are carried on the device carrier 14, can be held or arranged in a suitable position in the welding cell 11.

The quick-change coupling 16 comprises a first coupling unit 18 to be fixed to the plate shaped carrier unit 12, for example, by screw connection and a second coupling unit 20 to be fixed to the device carrier 14, for example, likewise by screw connection. This second coupling unit 20 can be fixed to a carrier plate 22 provided on the device carrier 14.

The quick-change coupling 16 makes it possible, by coupling the two coupling units 18, 20 of same, to mount the device carrier 14 on the carrier unit 12 in a rapid and detachable manner. In order to make this possible, a pushing meshing recess 24 is provided at the first coupling unit 18. The second coupling unit 20 comprises or is configured with a pushing meshing body 26, which can be inserted with its plate-like (plate shaped) structure into the pushing meshing recess 24. In order to generate a fixed, positive-locking meshing by the insertion, the pushing meshing recess forms in its lateral edge areas running in a direction of pushing R an undercut 28, which is configured, for example, in the form of a dovetail inner profile 30. In a corresponding manner, the pushing meshing body 26 is configured as a body extending behind the undercut 28, for example, with a dovetail outer profile 32.

To establish the pushing meshing, the pushing meshing body 26 of the second coupling unit 20, which pushing meshing body 26 is fixed to the device carrier 14, is inserted into the pushing meshing recess 24, for example, essentially in the horizontal direction in the direction of pushing R. The pushing meshing recess 24 is preferably defined by an insertion stop 34 in the direction of pushing R, so that a maximum insertion position of the pushing meshing body 26 into the pushing meshing recess 24 can be predefined by the insertion stop 34. A movement beyond this maximum insertion position is not possible.

In order to prevent the pushing meshing body 26 of the second coupling unit 20 from moving out of the pushing meshing recess 24, a clamping positioning device 36 is provided at the first coupling unit 18. This clamping positioning device 36 comprises a clamping positioning element 38, which is essentially displaceable obliquely to the direction of pushing R at the first coupling unit 18, and an actuating drive 40 associated with the clamping positioning element 38. The actuating drive 40 in turn is preferably provided with an actuating spindle 44, which is accommodated, for example, in a housing 42 provided at the first coupling unit 18. The actuating spindle 44 preferably has a self-locking configuration. The actuation of the actuating spindle 44 leads to displacement of the clamping positioning element 38 obliquely to the direction of pushing R.

When the pushing meshing body 26 is inserted into the pushing meshing recess 24, the clamping positioning element 38 can be brought into contact with a lateral edge area of the pushing meshing body 26 by moving the clamping positioning element 38 in the direction towards the pushing meshing body 26 and be pressed with pressure against same. In this connection, the contour of the clamping positioning element 38 can be adapted to the contour of the pushing meshing recess 24 to provide the undercut, i.e., of the dovetail inner profile 30, so that the clamping positioning element 38 can overlap the edge area of the pushing meshing body 26, which edge area has a complementary shape and is shaped with a dovetail outer profile 32.

A clamping action that also eliminates a slight clearance of motion between the pushing meshing body 26 and the first coupling unit 18 is generated by the clamping positioning element 38 or the clamping positioning device 36 when the pushing meshing body 26 is positioned in a manner meshing with the pushing meshing recess 24 and, for example, in contact with the insertion stop 34.

In order to be able to reach a defined position of the pushing meshing body 26 especially in the direction of pushing R when the clamping action is generated and when the pushing meshing body 26 is thus fixed in relation to the pushing meshing recess 24, a positive-locking positioning device, which is generally designated by 46, is further provided. This positive-locking positioning device 46 comprises a pin-like (pin shaped) positive-locking positioning element 48, which can be provided, for example, at the clamping positioning element 38 or provided by same. A positive-locking positioning recess 50 is provided at the pushing meshing body 26 in association with the positive-locking positioning element 48 such that this positive-locking positioning recess 50 is essentially open at right angles to the direction of pushing R. The positive-locking positioning element 48 and the positive-locking positioning recess 50 are coordinated with one another such that when the positive-locking positioning element 48 is meshed with the positive-locking positioning recess 50, essentially no clearance of motion is present between the pushing meshing body 26 and the positive-locking positioning element 48 and the clamping positioning element 38 and thus essentially also the first coupling unit 18 accommodating the positive-locking positioning element 48 and the clamping positioning element 38.

In order to avoid a redundancy in the determination of the position specification by the insertion stop 34, on the one hand, and the positive-locking positioning element 48, on the other hand, when the pushing meshing body 26 is fixed in the pushing meshing recess 24, the maximum insertion position reached when the insertion stop 34 becomes active does not correspond to the operating position of the pushing meshing body 26 in the pushing meshing recess 24 to be provided for a welding operation. Rather, the maximum insertion position is a position, into which the pushing meshing body 26 is brought by moving beyond the operating position.

For insertion of the second coupling unit 20, i.e., of the plate-like pushing meshing body 26, into the first coupling unit 18, i.e., the pushing meshing recess 24, the clamping positioning device 36 and thus also the positive-locking positioning device 46 are at first in a released state. In this state, the pushing meshing body 26 can be inserted unhindered until it comes into contact with the insertion stop 34. Subsequently, the clamping positioning element 38 and with this the positive-locking positioning element 48 are moved in the direction towards the pushing meshing body 26 by manual action or, for example, also motor action on the actuating drive 40, i.e., especially the actuating spindle 44. Even before the clamping positioning element 38 can carry out its clamping action, the positive-locking positioning element 48 enters into the positive-locking positioning recess 50. Since these are not in a relative position to one another corresponding to the operating position, a positioning bevel 52 is provided at the positive-locking positioning element 48 in the example shown. Due to the wedge-like action of the positioning bevel 52, the positioning bevel 52 releases a force acting on the pushing meshing body 26 opposite the direction of pushing R when the positive-locking positioning element 48 is moved towards the pushing meshing body 26 and when the positive-locking positioning element 48 enters into the positive-locking positioning recess 50, as a result of which the pushing meshing body 26 is displaced in the direction towards the operating position. In this state, the positive-locking positioning element 48 and the positive-locking positioning recess 50 are correctly aligned in relation to one another, and the positive-locking positioning element 48 may further enter into the positive-locking positioning recess 50 for the defined specification of the pushing meshing body 26, so that the positive-locking positioning state is reached, in which a movement of the pushing meshing body 26 in the direction of pushing R or opposite the direction of pushing R is no longer possible.

In the case of further continued movement of the clamping positioning element 38 also carrying the positive-locking positioning element 48 in the direction towards the pushing meshing body 26, the clamping positioning element 38 comes into contact with the lateral edge area of the pushing meshing body 26 and thus generates a clamping action in a clamping positioning state induced at that time, which clamping action prevents any movement of the pushing meshing body 26 in relation to the first coupling unit 18. This is especially supported by the fact that due to the lateral action of the clamping positioning element 38 on the pushing meshing body 26, the dovetail outer profile and the dovetail inner profile meshing with one another additionally generate a force pressing the pushing meshing body 26 essentially at right angles to the direction of pushing R in the direction of a bottom 54 of the pushing meshing recess 24.

When carrying out a welding operation, in order to prevent vibrations possibly occurring from leading to an uncoupling of the actuating drive 40, a blocking device, generally designated by 46, may additionally be associated with this actuating drive 40. This blocking device 46 may be accommodated in the housing 42 and comprise, for example, a clamping element, which can be activated by a clamping lever 58. This clamping element presses in the area of the actuating drive 40 or of the actuating spindle 44 guided in the housing 42 against this actuating spindle 44 and thus prevents a detaching of the actuating drive 40, which has a self-locking configuration already known per se, by means of friction force or/and by means of positive locking.

Should a device carrier 14 carried on the carrier unit 12 be removed from the welding cell of a welding system 10 after carrying out a welding operation, the blocking device 56 can first be deactivated. By acting on the actuating spindle 44, the clamping positioning device 36 and with this the positive-locking positioning device 46 are then brought by lateral retraction of the clamping positioning element 38 and of the positive-locking positioning element 48 into the released state. In this released state the pushing meshing body 26 together with the device carrier 14 carrying same can be moved laterally out of the pushing meshing recess 24 in order to mesh with the first coupling unit 18 for a welding operation to be carried out subsequently, for example, another device carrier already equipped with components to be welded together with the pushing meshing body 26 carried on such carrier.

It should be pointed out that the plate shaped pushing meshing body 26, which essentially provides the second coupling unit 20, may consist of a single plate-like component, preferably made of metallic material. The second coupling unit 20, which has a more complicated configuration, may preferably be made of metallic material with a base plate to be fixed to the carrier unit 12 and also to provide the bottom 54 of the pushing meshing recess 24. The base plate side plates provide the dovetail inner profile 30 and an end plate providing the insertion stop 34, each preferably made of metallic material, can be fixed by means of screw connection. The housing 42 accommodating the actuating spindle 44 and the blocking device 56 can be accommodated in the area of one of the side plates. This side plate has, furthermore, a recess, in which the clamping positioning element 38, which is displaceable obliquely to the direction of pushing R, is accommodated or guided.

Figure 5:
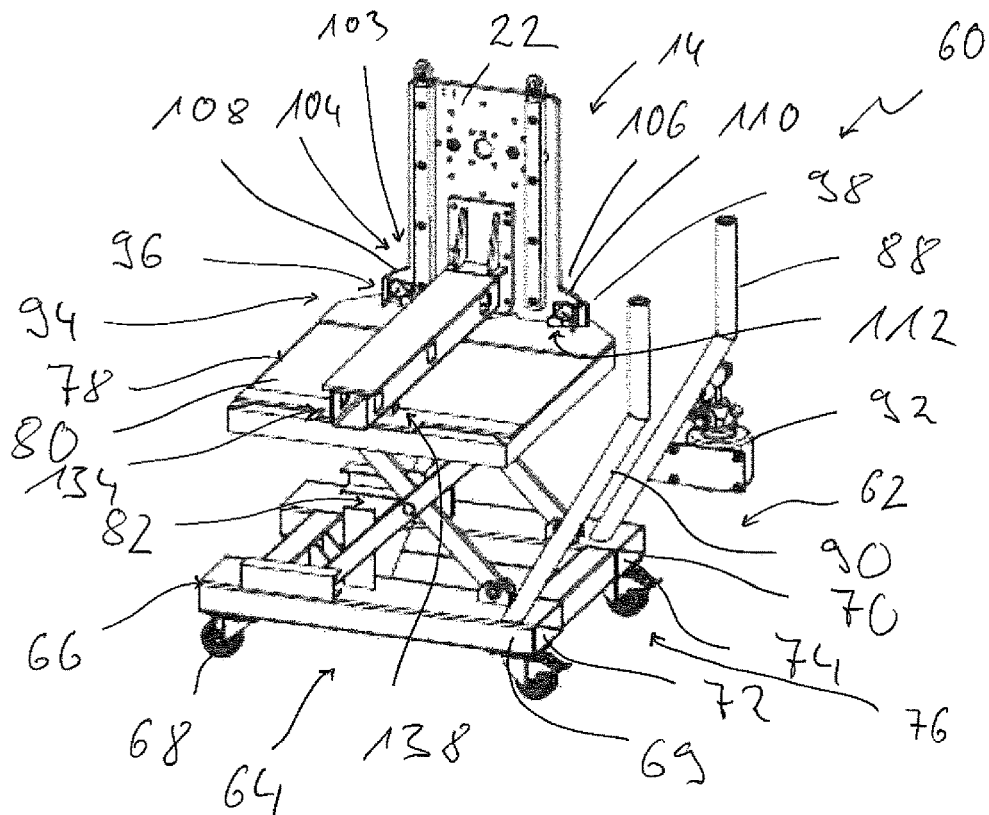
FIG. 5 is a perspective view a conveyor system with a conveying vehicle and with a device carrier carried on a superstructure of the conveying vehicle.
Figure 6:
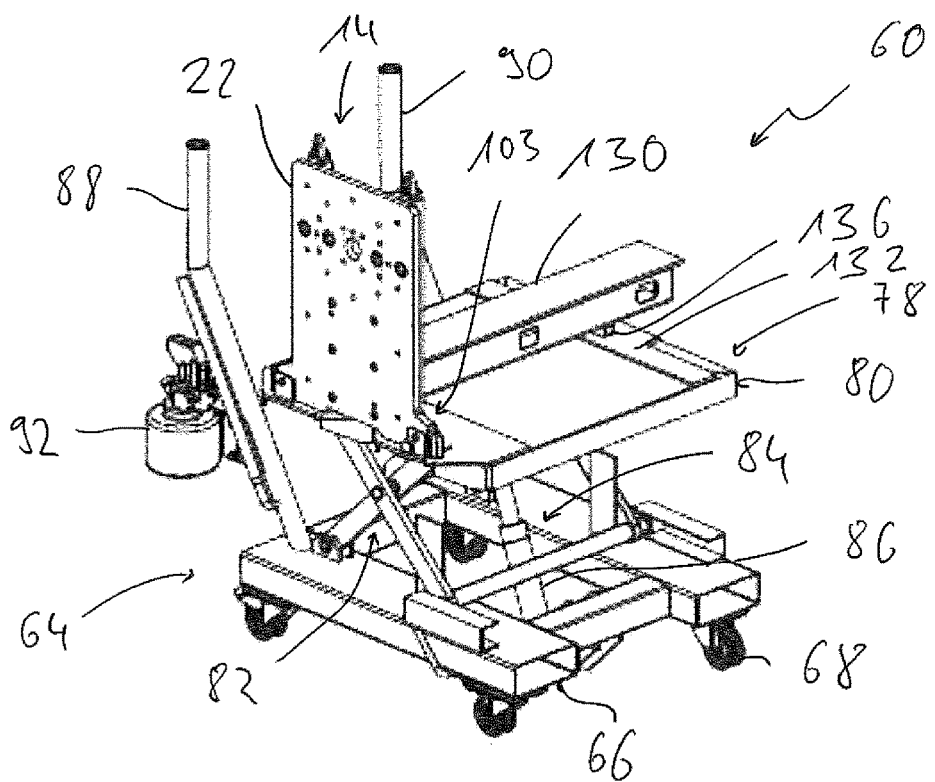
FIG. 6 is another perspective view of the conveyor system according to FIG. 5.
Figure 7:
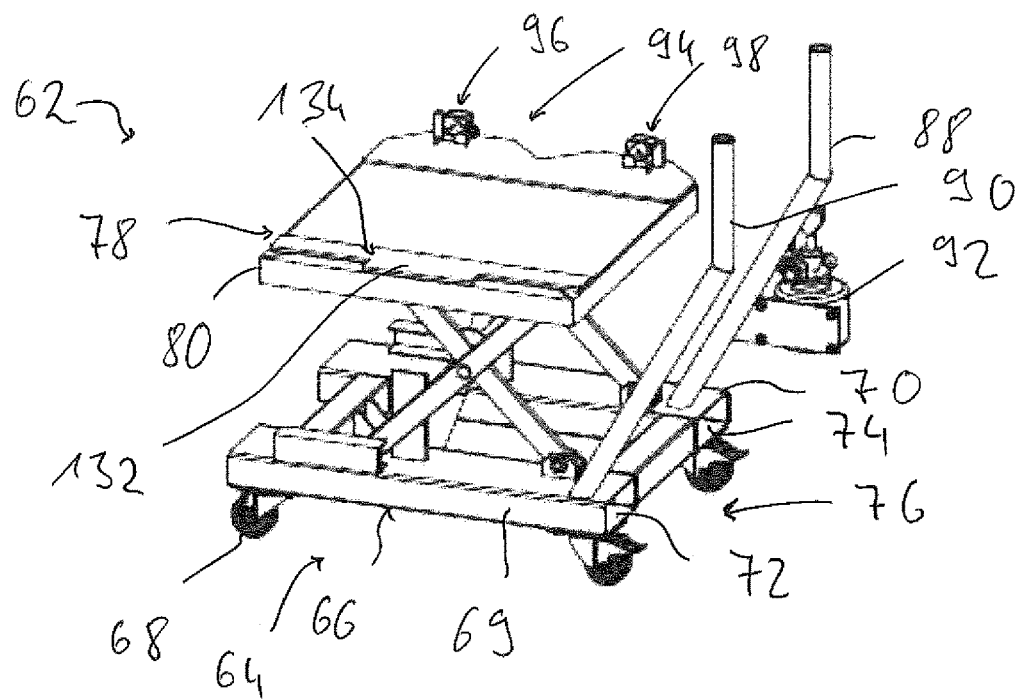
FIG. 7 is a perspective view showing the conveying vehicle of the conveyor system according to FIG. 5.
Figure 8:
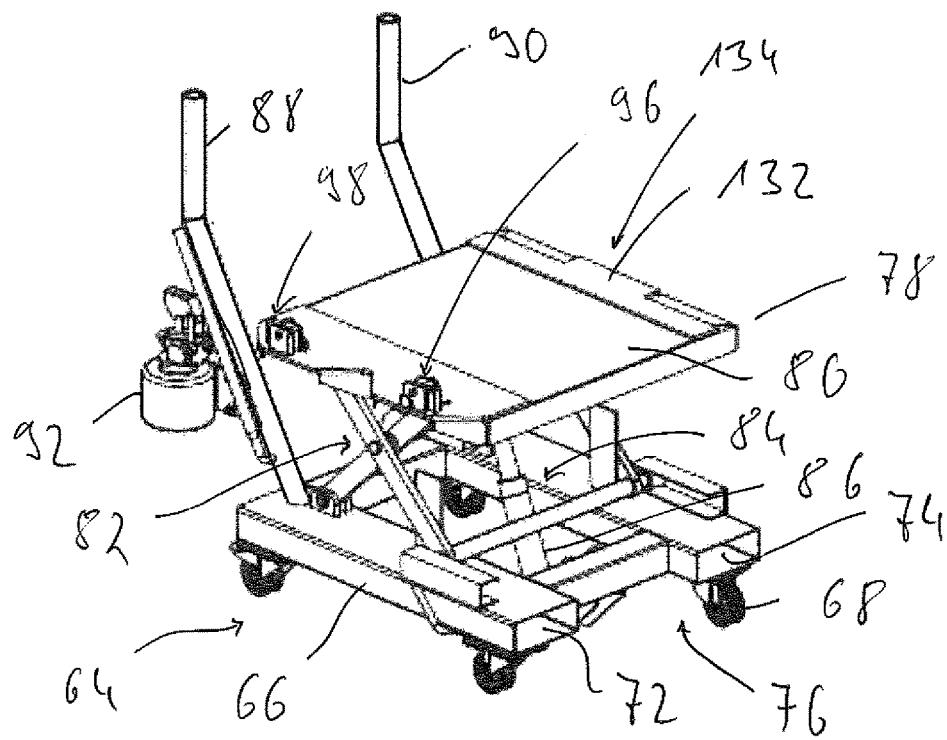
FIG. 8 is a perspective view showing the conveying vehicle shown in FIG. 7, viewed in another direction.

FIGS. 5 and 6 show a conveyor system, generally designated by 60, which comprises, on the one hand, the device carrier 14 already explained above with reference to FIG. 1, and, on the other hand, a conveying vehicle 62 receiving the device carrier 14 in the conveyed or stored state. The device carrier 14 equipped with the components to be welded together can be positioned in a welding cell 11 of a welding system 10 and removed from this welding cell with the conveying vehicle 62 with the use of the quick-change coupling 16 described in detail above with reference to FIGS. 1 through 4.

The conveying vehicle 62 comprises a chassis 64, which can travel on rollers 68 provided, for example, on a frame 66. It should be noted that in the sense of the present invention, a roller comprises any formation suitable for moving the conveying vehicle 62, e.g., roller, wheel or the like. The frame 66 of the chassis 64 is built with two elongated hollow section parts 69, 70, which are permanently connected to one another. These form respective meshing shafts 72, 74 of a lifting machine meshing (engagement) formation generally designated by 76. A lifting machine, for example, a forklift or a lift truck or the like, may be positioned such that the lifting machine meshes with the meshing shafts 72, 74 by means of corresponding fork-shaped lifting tines and thus lift the entire conveying vehicle 62 or the entire conveyor system 60 and position the entire conveying vehicle 62 or the entire conveyor system 60, for example, in a storage rack or the like or remove it from such a storage position.

A superstructure, generally designated by 78, is carried adjustably on the chassis 64. The superstructure 78 comprises a plate-like (plate shaped) carrier 80, which is adjustable in the vertical direction by means of a scissor-type lifting mechanism (scissor lifting mechanism) 82. An adjusting drive 84 is associated with the scissor lifting mechanism 82. This adjusting drive 84 comprises in the example being shown a piston-and-cylinder unit 86, which can be actuated with pressurized fluid, especially hydraulically, in order to adjust the superstructure 78 in the vertical direction on the chassis 64.

Two handles 88, 90, which make it possible for an operator to move the entire conveyor system 60 in an ergonomically advantageous manner, are provided on the chassis 64. A connecting/actuating unit generally designated by 92 is provided on the handle 88. The adjusting drive 84 can be connected via this unit 92 to an external power source, i.e., to a pressurized fluid supply system, and the piston-and-cylinder unit 86 can be adjusted, when the pressurized fluid supply system is connected, by feeding or removing pressurized fluid, in order to adjust in this manner the vertical position of the plate-like carrier 80 of the superstructure 78 in the desired manner.

To fix the device carrier 14 on the superstructure 78, a positioning/holding formation generally designated by 94 is provided. This positioning/holding formation 94 ensures that the device carrier 14 can be held on the superstructure 78 in a stable manner and in a defined position. The positioning/holding formation 94 also makes it possible to detach the device carrier 14 from the superstructure 78, especially when the two coupling units 18, 20 of the quick-change coupling 16 are caused to mesh with one another and the device carrier 14 with the components being carried on the device carrier 14 is thus being held in a stable manner on the carrier unit 12 of a welding cell and the conveying vehicle 62 is removed for carrying out a welding operation.

The positioning/holding formation 94 comprises two first positioning/holding units 96, 98. The device carrier 14 is held on the superstructure 78 of the conveying vehicle 62 by means of the two first positioning/holding units 96, 98 such that the device carrier 14 is essentially unmovable in each direction in space. This means that the device carrier 14 cannot be moved either in the vertical direction upward or downward or in the horizontal direction due to the holding action of the first positioning/holding units 96, 98. Each of the first positioning/holding units 96, 98 shown in more detail in FIG. 9 on the basis of the first positioning/holding unit 98 comprises on the superstructure 78 an essentially U-shaped positioning/holding mount 100. The two positioning/holding mounts 100 of the first positioning/holding units 96, 98 are fixed on the plate-like carrier 80 of the superstructure 78 in such an orientation that a mounting recess 102 formed in these positioning/holding mounts 100 is open upward and in the direction of the respective other positioning/holding mount 100.

Associated with the two positioning/holding units 96, 98 and their respective positioning/holding mounts 100, respective counter-positioning/holding units 104, 106 of a second counter-positioning/holding formation 103 are provided on the device carrier 14 or on the carrier plate 22 thereof. These counter-positioning/holding units 104, 106 comprise positioning/holding projections 108, 110, which project laterally on the carrier plate 22 and which can be inserted, to establish the holding interaction, from above into the mounting recesses 102 of the first positioning/holding units 96, 98 or of the positioning/holding mounts 100 thereof by lowering the device carrier 14 toward the superstructure 78, and are then received therein essentially without clearance of motion. When the device carrier 14 is completely lowered, it then lies, for example, in the area of the carrier plate 22, in the vertical direction on the plate-like carrier 80 of the superstructure 78 and is thus already held essentially against movement in relation to the superstructure 78 in the vertical direction downward and in any horizontal direction.

To guarantee secure holding together, a holding element 112 is provided in association with each first positioning/holding unit 96, 98 and first counter-positioning/holding unit 104, 106 received therein. Each holding element 112 comprises a holding bolt 114, which passes through an opening 116 formed in a respective positioning/holding projection 108, 110 as well as corresponding openings 118, 120 in the positioning/holding mount 100 surrounding the positioning/holding projection 108, 110. Positive locking, which prevents the device carrier 14 from being lifted off from the superstructure 78 in the vertical upwards direction, is thus also generated by the holding bolt 114.

Figure 9:
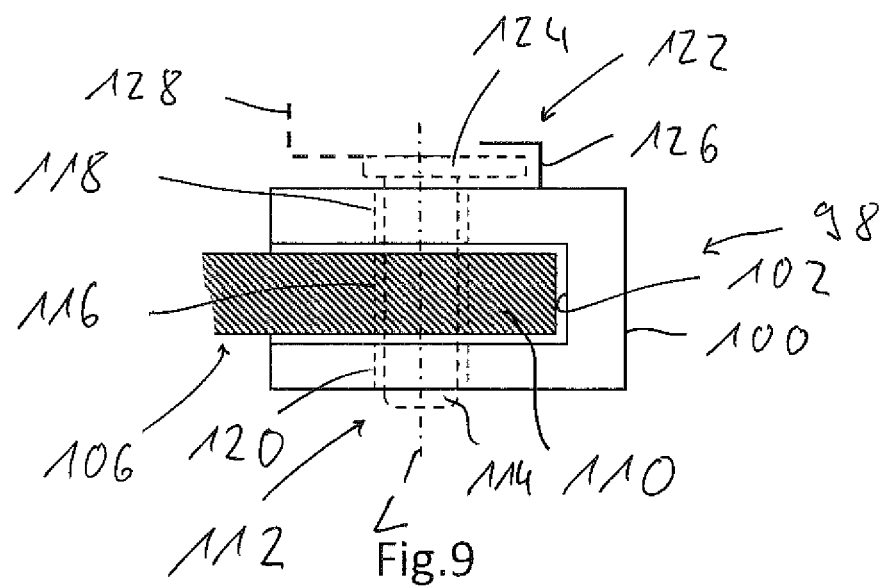
FIG. 9 is a schematic view showing a positioning/holding unit cooperating with a counter-positioning/holding unit.

To prevent the holding bolts 114 meshing with the openings 116, 118, 120 from becoming detached from the respective first positioning/holding units 96, 98, a locking unit generally designated by 122 is associated with a respective holding element 112. This locking unit 122 comprises, at the respective holding bolt 114, a meshing formation 124, which is, for example, disk-shaped and is not rotationally symmetrical in relation to a respective longitudinal axis L of the holding bolt 114. The meshing formation 124 projects radially, as is illustrated in FIG. 9, to different extents in relation to a longitudinal axis of the holding bolt 114, in different circumferential areas based on its non-rotationally symmetrical configuration. In association with this meshing formation 124, a counter-meshing formation 126, providing an undercut, is provided on a respective positioning/holding mount 100. By rotating the holding element 112 by means of an actuating lever 128 about the longitudinal axis L of the holding bolt 114, the meshing formation 124 can be caused to mesh and to cease to mesh with the counter-meshing formation 126. In case of the meshing shown in FIG. 9, a respective holding element 112 cannot be displaced in the direction of the longitudinal axis L of the holding bolt 114. The holding bolt 114 can be removed from or pushed into the openings 116, 118, 120 receiving the holding bolt 114 when the meshing is abolished.

The device carrier 14 comprises, in addition to the carrier plate 22, which receives the first counter-positioning/holding units 104, 106, on the one hand, and the second coupling unit 20, on the other hand, a carrier 130. The carrier 130, which is fixed to the carrier plate 22, extends away from the carrier plate 22 and has, for example, a beam-like (beam shaped) configuration. The components to be welded together can be positioned on the beam-like carrier 130 with the use of corresponding holding or clamping tools. At the end area of the beam-like carrier 130, which end area is located at a spaced location from the connection to the carrier plate 22, the positioning/holding formation 94 comprises a second positioning/holding unit 134 provided by a support surface 132 on the plate-like carrier 80 of the superstructure 78. A support 136, which has, for example, a rail-like configuration and provides essentially a second counter-positioning/holding unit 138, is provided at the beam-like carrier 130 of the device carrier 14. With the device carrier 14 positioned on the superstructure 78, said device carrier thus also lies in its end area located at a distance from the carrier plate 22 on the superstructure 78 in a stable manner and is thus held against movement in the vertically downward direction by the cooperation of the second positioning/holding unit 134 with the second counter-positioning/holding unit 138. Based on the existing frictional interaction, it is also possible to obtain a holding interaction acting in the horizontal direction. To reinforce this, respective projections and recesses, which are caused to mesh with one another when the device carrier 14 is lowered onto the superstructure 78 and can thus generate a positive locking acting in the horizontal direction, may be provided on the support surface 132, on the one hand, and on the support 136, on the other hand.

While specific embodiments of the invention have been shown and described in detail to illustrate the application of the principles of the invention, it will be understood that the invention may be embodied otherwise without departing from such principles.

What is claimed is:

1. A conveyor system for conveying devices for receiving components to be welded together into and out of a welding cell, the conveyor system comprising:
    a conveying vehicle comprising a chassis, rollers for displacement of the conveying vehicle on a subfloor, a superstructure carried vertically adjustably on the chassis, and a positioning/holding formation provided on the superstructure; and
    at least one device carrier for receiving components to be welded together in a position intended for welding together in relation to one another, wherein the at least one device carrier comprises a counter-positioning/holding formation, which meshes with or can be caused to mesh with the positioning/holding formation, for presetting a conveying position of the device carrier on the superstructure, the conveyor system further comprising:
    at least one handle for moving the conveying vehicle, wherein the at least one handle being provided on the conveying vehicle and is connected to the chassis; or
    a scissor-type lifting mechanism carrying the superstructure vertically adjustably in relation to the chassis; or
    a lifting machine engagement formation on the chassis; or
    any combination of at least one handle for moving the conveying vehicle, wherein the at least one handle is provided on the conveying vehicle and is connected to the chassis and a scissor-type lifting mechanism carrying the superstructure vertically adjustably in relation to the chassis and a lifting machine engagement formation on the chassis.

2. A conveyor system in accordance with claim 1, wherein:
    the positioning/holding formation comprises two positioning/holding units;
    the counter-positioning/holding formation comprises two counter-positioning/holding units;
    each of the counter-positioning/holding units mesh with or can be caused to mesh with one of the positioning/holding units;
    the device carrier is held essentially unmovable in relation to the superstructure in each direction in space by each counter-positioning/holding unit meshing with an associated positioning/holding unit.

3. A conveyor system in accordance with claim 2, wherein:
    each positioning/holding unit or each counter-positioning/holding unit comprises a positioning/holding mount;
    each counter-positioning/holding unit or each positioning/holding unit comprises a positioning/holding projection positioned or positionable to mesh with the positioning/holding mount.

4. A conveyor system in accordance with claim 3, wherein:
- each of the positioning/holding units or/and each of the counter-positioning/holding units comprise a holding element, which holding element prevents the positioning/holding projection from moving out of the positioning/holding mount receiving the positioning/holding projection.

5. A conveyor system in accordance with claim 4, wherein:
- each holding element comprises a holding bolt positioned or positionable to pass through at least one mount opening of an associated one of the positioning/holding mounts and through a bolt opening, which is positioned or can be positioned such that the holding bolt meshes with the positioning/holding mount;
- the mount opening is aligned with the a bolt opening.

6. A conveyor system in accordance with claim 4, wherein:
- each holding element comprises a holding bolt positioned or positionable to pass through at least one mount opening of an associated one of the positioning/holding mounts and through a bolt opening, which is positioned or can be positioned such that the holding bolt meshes with the positioning/holding mount;
- the mount opening is aligned with the bolt opening;
- a locking device is associated with each holding element and secures the holding element against moving out of the mount opening and the bolt opening;
- the locking device positively locks and is activated and deactivated by rotating the holding element.

7. A conveyor system in accordance with claim 1, wherein:
- the positioning/holding formation comprises at least one first positioning/holding unit and at least one second positioning/holding unit;
- the counter-positioning/holding formation comprises at least one first counter-positioning/holding unit and at least one second counter-positioning/holding unit;
- each of the first counter-positioning/holding units mesh with or can be caused to mesh with one of the first positioning/holding units;
- each of the second counter-positioning/holding units mesh with or can be caused to mesh with one of the second positioning/holding units;
- the device carrier is held against movement essentially in a horizontal direction or/and against movement in a vertical direction downward in relation to the superstructure by the respective second counter-positioning/holding units meshing with the respective second positioning/holding units.

8. A conveyor system in accordance with claim 7, wherein:
- at least one second positioning/holding unit comprises a support surface on the superstructure; and
- at least one second counter-positioning/holding unit comprises a support that is positioned or can be positioned such that the support lies on the support surface on the superstructure.

9. A conveyor system in accordance with claim 1, wherein the lifting machine engagement formation comprises at least two lifting tool meshing openings comprised of elongated hollow section frame parts extending essentially parallel to one another.

10. A conveyor system in accordance with claim 1, wherein:
- the scissor-type lifting mechanism comprises an adjusting drive actuated with pressurized fluid; or
- the scissor-type lifting mechanism comprises a connecting/actuating unit provided on the conveying vehicle for connecting an adjusting drive, associated with the scissor-type lifting mechanism to a power source and for actuating the adjusting drive; or
- the scissor-type lifting mechanism comprises an adjusting drive actuated with pressurized fluid and a connecting/actuating unit provided on the conveying vehicle for connecting the adjusting drive to a power source and for actuating the adjusting drive.

11. A conveyor system in accordance with claim 1, further comprising a first coupling unit provided at a welding cell, wherein the at least one device carrier comprises a second coupling unit, which can be caused to mesh with the first coupling unit, for detachably fixing the at least one device carrier at the first coupling unit.

12. A conveyor system in accordance with claim 11, wherein one of the first coupling unit and the second coupling unit has a pushing meshing recess and the other of the first coupling unit and the second coupling unit has a pushing meshing body that can be pushed into the pushing meshing recess in a pushing direction.

13. A conveyor system in accordance with claim 12, wherein:
- the first coupling unit and second coupling unit have a positive-locking positioning device that is adjustable between a released state and a positive-locking positioning state;
- the positive-locking positioning device holds the pushing meshing body in an operating position in relation to the pushing meshing recess against displacement in the pushing meshing recess in positive-locking positioning state when the pushing meshing body is positioned such that the pushing meshing body meshes with the pushing meshing recess.

14. A conveyor system in accordance with claim 12, wherein:
- the pushing meshing recess forms an undercut and the pushing meshing body, pushed into the pushing meshing recess, extends behind the undercut; and
- the pushing meshing recess has a dovetail inner profile and the pushing meshing body has a dovetail outer profile.

15. A conveyor system for conveying devices for receiving components to be welded together into and out of a welding cell, the conveyor system comprising:
- a conveying vehicle comprising a chassis, rollers for displacement of the conveying vehicle on a subfloor, a superstructure carried vertically adjustably on the chassis, and a positioning/holding formation provided on the superstructure;
- at least one device carrier for receiving components to be welded together in a position intended for welding together in relation to one another, wherein the at least one device carrier comprises a counter-positioning/holding formation, which meshes with or can be caused to mesh with the positioning/holding formation, for presetting a conveying position of the device carrier on the superstructure; and
- a first coupling unit provided at a welding cell, wherein the at least one device carrier comprises a second coupling unit, which can be caused to mesh with the first coupling unit, for detachably fixing the at least one device carrier at the first coupling unit, wherein one of the first coupling unit and the second coupling unit has a pushing meshing recess and the other of the first coupling unit and the second coupling unit has a pushing meshing body that can be pushed into the pushing meshing recess in a pushing direction, wherein the pushing meshing recess having a dovetail inner profile forms an undercut and the pushing meshing body having a dovetail outer profile, pushed into the pushing meshing recess, extends behind the undercut.

* * * * *